UNITED STATES PATENT OFFICE.

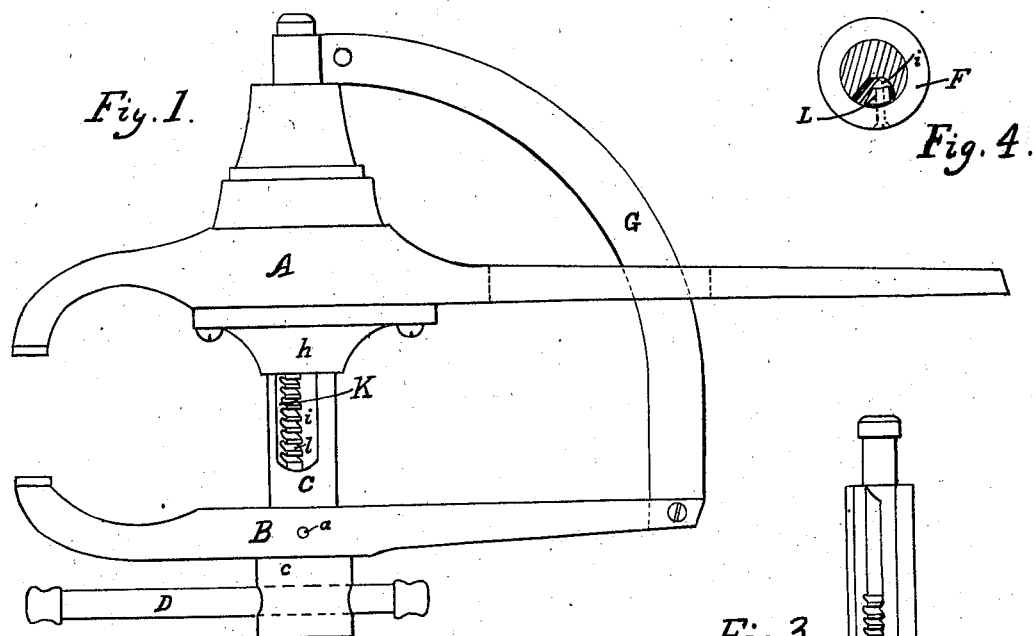
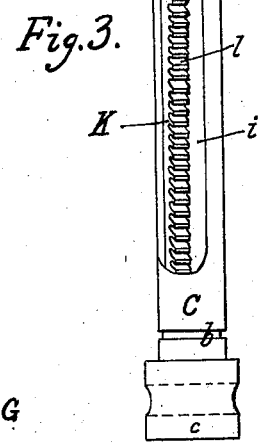
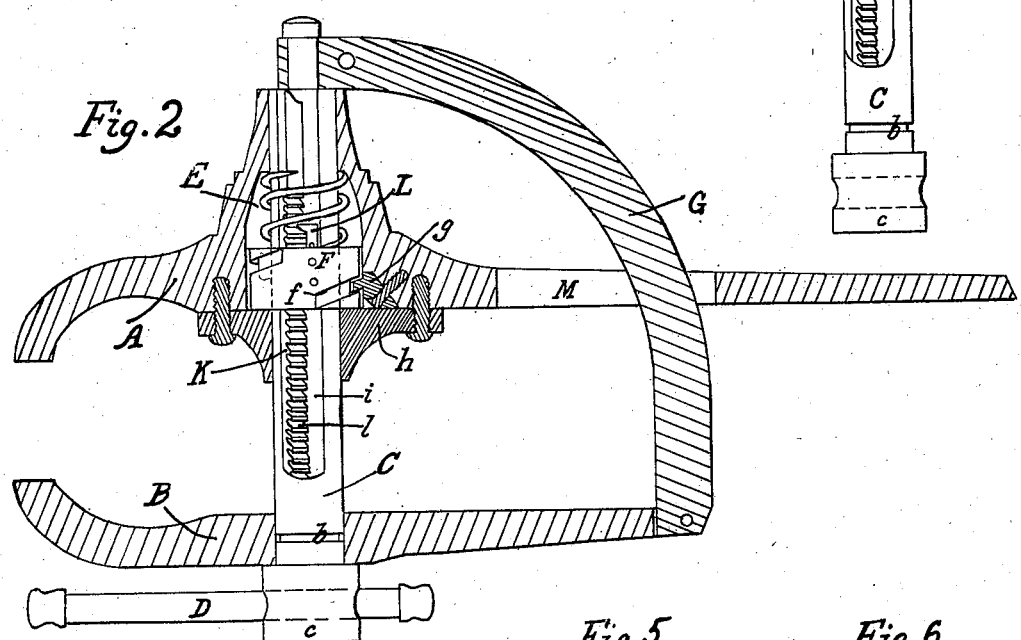
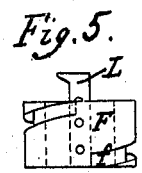
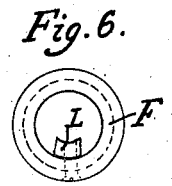

BENJAMIN G. BALL, OF NASHUA, NEW HAMPSHIRE.

BENCH-VISE.

Specification of Letters Patent No. 14,550, dated April 1, 1856.

*To all whom it may concern:*

Be it known that I, BENJAMIN G. BALL, of Nashua, in the county of Hillsboro and State of New Hampshire, have invented an Improvement in Bench - Vises; and I do hereby declare that the same is fully described and represented in the following specification and the accompanying drawings, of which—

Figure 1, exhibits a side elevation of one of my improved vises. Fig. 2, a vertical, central and longitudinal section of it. Fig. 3, a side view of its rotary shaft. Fig. 4, a cross section of said rotary shaft, and the screw connection to be hereinafter described. Fig. 5, a side view of the tubular part of the screw connection. Fig. 6, is an end view of the same.

In these drawings A, denotes a stationary jaw, and B, the movable jaw of said vise. There extends through the shanks of both jaws, a rotary shaft C, which should be so applied to the shank of the movable jaw as to be capable of turning around thereon, and to be immovable in other respects relatively to said jaw. For this purpose a pin, $a$, may extend into the shank of the jaw, and also into a grove, $b$, formed around in the shaft C, near its head, $c$, as seen in Fig. 3. To the shaft C, a turning and sliding lever D, is applied as seen in the drawings. There is a cylindrical chamber E, formed in the shank of the stationary jaw, the same being of sufficient capacity to receive what is called a tubular connection block F, (see Figs. 2, 4, 5 and 6.) This block has a helical screw $f$, formed on its periphery and made to receive a small projection or portion of the screw thread, $g$, extended from the lower side of the chamber E, as seen in Fig. 2.

The shaft C, slides freely in a longitudinal direction through the block F, which is confined within the chamber, E, by a cap, $h$, and so as to be incapable of endwise motion, while it may be rotated or turned transversely. In connection with the sliding shaft and the screw connection, I make use of a clutch arranged and formed as hereinafter described, that is to say, I provide the turning shaft, C, with a long cavity or groove, $i$, on one side of which I arrange a tooth rack, K, as seen in the drawings. Extending into the groove or cavity, $i$, from the block, F, is a stud, projection or tooth, L, which is so formed as to be capable of entering between the teeth of the rack when the latter are turned by the shaft into contact with it. The distance between the rack and the opposite side of the groove, $i$, should be made greater than the width of the tooth $l$, as seen in Fig. 3, in order that when the tooth is not in engagement with the rack, the shaft, C, may be moved endwise freely through the screw connection block and shank of the stationary jaw, and so as to carry with it the movable jaw and either toward or away from the stationary jaw.

Within the upper end of a curved arm, G, extending through a slot, M, formed through the shank of the stationary jaw, the shaft C, is fitted so that it may rotate but when moved longitudinally shall move the said curved arm with it—the arm at its lower end being fastened to the lower part of the shank of the movable jaw. The object of the curved arm, G, is to maintain the movable jaw in its proper position with respect to the stationary jaw at whatever distance the two jaws may be apart.

With a vise constructed in the above improved manner, the operation of fastening an article between its jaws, is very quickly accomplished, as in order to do the same, it will be necessary to turn the shaft, C, a little in order to move the stud L, out of engagement with the rack, K; this will admit the movable jaw and shaft, C, to be conjointly moved so as to carry the movable jaw toward the stationary jaw and against the article placed between them, and against the gripping face of the stationary jaw. This having been accomplished the shaft, C, is to be turned a little so as not only to clutch to the screw connection block, but to rotate said shank a little. By the rotary movement of said block, and by the action of its stationary screw thread projection, the movable jaw will be drawn closer up to the article placed between its two jaws.

From the above it will be perceived therefore, that by my improved vise, an article may be very expeditiously clamped between the jaws, without the necessity of first spending a great deal of time in moving one jaw up toward the other, and toward the article between them by a series of revolutions.

I am aware that a vise has been constructed so as to have one of its jaws movable on a rack bar, and held in position by a pawl, while the other jaw was applied to a system of levers operated by a treadle, and so as to move said latter jaw toward the first jaw, the same being described on page 739 of vol. 2, of *Appleton's Dictionary of Machines*, etc., published in New York in 1852. My vise differs essentially from this, and I only refer to it to show that the principle of moving one jaw toward the other and upon a bar to which the other is applied, and having said other jaw subsequently moved by other mechanism is not a new one and that the principle of so constructing a vise, is not what I claim to have invented, but that my invention rests on an improvement, as above described.

Therefore what I claim is—

Combining, with the rotary shaft, C, and the shanks of the jaws A, and B, the tubular screw connection, and the clutch as described, when a rotary shaft is made to actuate the jaws, the whole being constructed and made to operate substantially in manner and for the purpose as above set forth.

In testimony whereof I have hereunto set my signature this third day of March A. D. 1856.

BENJ. G. BALL.

Witnesses:
E. B. WEST,
A. F. STEVENS.